Patented July 30, 1946

2,405,031

UNITED STATES PATENT OFFICE 2,405,031

METHOD OF PRODUCING LUMINESCENT ZINC SULPHIDE

Mac Goodman, New York, N. Y.

No Drawing. Application June 24, 1940, Serial No. 342,077

10 Claims. (Cl. 252—301.6)

This invention relates to improvements in luminescent compositions and methods of producing the same, being particularly directed to fluorescent and phosphorescent zinc sulphide products.

Up to the present time in the manufacture of luminescent compositions of the zinc sulphide or analogous classes, it has been essential not only to carry out a calcination of the mix in a non-oxidizing or reducing atmosphere, whether it be that of zinc sulphide together with fluxes and activators on the one hand, or that of zinc oxide and sulphur in stoichiometric proportions as defined in my co-pending application, Serial No. 336,831, filed May 23, 1940, on the other hand, but in commercial operations even with the greatest of care the presence of air or oxygen even in relatively small quantities in the ignition chamber is found to decrease the luminescence of the end product resulting from calcination by virtue of the formation through oxidation of deleterious and unwanted byproducts.

I have found that by addition of volatile salts to the mix, be it of the character of either the well-known zinc sulphide-flux-activator mix of the prior art, as for example, a mix incorporating zinc sulphide to which has been added a relatively small amount of a flux such as sodium chloride or sodium sulphate and a minute amount of an activator such as copper or silver chloride or nitrate or the zinc oxide and sulphur mix referred to in my co-pending application, I am able to avoid oxidation during ignition through the development of vapors or gases as decomposition products of such volatile salts; which vapors or gases after development upon discharge from the chamber scrub or sweep out any air or oxygen from the ignition chamber either as combined or uncombined therewith.

I have further found that it is not necessary to tightly seal the ignition chamber against ingress of air, since with the development during ignition of the vapors or gases from the volatile salts added to the mix aforesaid, a preponderance of the volume of the atmosphere in the ignition chamber comprises the vapors or gases of the volatile salts which by their nature are non-oxidizing and which, being continually developed as the ignition proceeds, not only substantially fill the ignition chamber, but as they are discharged therefrom carry along in a substantially scrubbing effect any air or oxygen normally in the ignition chamber or entering into the same as the reaction progresses.

I have further found that by adding to the mix of zinc oxide and sulphur in stoichiometric proportions referred to in my co-pending application aforesaid, a quantity of a volatile salt preferably in saturated solution capable of acting as a solvent for the zinc oxide of such mix, that upon ignition the end product comprises a very light and fluffy product of relatively very small crystal size, qualities which give greater emission efficiency and adaptability for commercial use in mixtures for paints or the like.

These and other advantages, capabilities and features of the invention will appear from the subjoined detailed description of one specific embodiment thereof.

In carrying out a preferred embodiment of my process I form my mix by adding to stoichiometric proportions of zinc oxide and sulphur as defined in my aforesaid co-pending application, between three-quarters of a mol and a mol of ammonium carbonate, which quantity substantially is in stoichiometric proportions with respect to the zinc oxide and sulphur and ignite for a period of one-half hour to an hour at from 1100° to 1250° C.

I prefer to apply the ammonium carbonate, zinc oxide-sulphur mix in saturated solution since under such conditions the aforesaid volatile salt acts as a solvent for the zinc oxide of the mix and by such solvent action provides for the formation to some extent of zinc carbonate on the one hand, and undissolved zinc oxide of reduced particle size on the other, as a result of which there is provided a more intimate mixture of the sulphur and zinc oxide upon drying at temperatures of between 100°–105° C. The composition of the mass after drying contains sulphur and zinc oxide and to some extent basic zinc carbonate.

During ignition of the aforesaid mix at the temperature range between 1100° and 1250° C. for a period of one-half hour to one hour, there is developed in the ignition chamber carbon dioxide, ammonium and water vapor, most of which is discharged from the ignition chamber as the reaction proceeds, carrying with it in a scrubbing action the oxygen or air present in or entering the chamber; that portion of the developed vapors and gases remaining in the chamber serving essentially to provide a non-oxidizing atmosphere in such chamber.

During ignition, the relatively small quantity of zinc carbonate developed in the pre-ignition mixing step is broken down to form zinc oxide and carbon dioxide so that at the end of the calcination period the crystals formed are luminescent zinc sulphide crystals in the distorted lattice formation of which are occluded zinc oxide in solid solution, as described in my copending application aforesaid.

Although I have referred to the use of ammonium carbonate as the volatile salt useful for the purpose aforesaid, I may apply other inorganic salts of the same character, as for example, ammonium bicarbonate and organic compounds as, for example, urea, and thiourea, and any and all other compounds which upon decomposition at or below the ignition temperatures above specified produce carbon dioxide, ammonia, or both, or gases or vapors of a non-oxidizing nature.

It is obvious that various changes and modifications may be made to the details of construction without departing from the general spirit of the invention as set forth in the appended claims.

I claim:

1. The method of producing a luminescent composition, comprising admixing with substances incorporating zinc and sulphur capable of forming a luminescent zinc sulphide upon calcination, a volatile salt convertible by heating into ammonia vapor, and subjecting the mixture to ignition in a chamber whereby the luminescent end product is formed in the non-oxidizing atmosphere of ammonia vapor developed during the ignition reaction.

2. The method of producing a luminescent composition, comprising admixing with substances incorporating zinc and sulphur capable of forming a luminescent zinc sulphide upon calcination, a volatile salt of a group consisting of ammonium and amine compositions convertible by heating into a non-oxidizing vapor, and subjecting the mixture to ignition in a chamber whereby the luminescent end product is formed in the non-oxidizing atmosphere developed during the ignition reaction.

3. The method of producing a luminescent composition, comprising admixing with a substance incorporating zinc and sulphur capable of forming a luminescent zinc sulphide upon calcination, a volatile salt convertible by heating into carbon dioxide and ammonia vapor, and subjecting the mixture to ignition in a chamber, whereby the luminescent end produce is formed in the non-oxidizing atmosphere of carbon dioxide and ammonia developed during the ignition reaction.

4. The method of producing a luminescent composition, comprising admixing with zinc oxide and sulphur capable of forming a luminescent zinc sulphide upon calcination, a volatile salt convertible by heating into carbon dioxide and ammonia vapor, and subjecting the mixture to ignition in a chamber, whereby the luminescent end product is formed in the non-oxidizing atmosphere of carbon dioxide and ammonia developed during the ignition reaction.

5. The method of producing a luminescent composition, comprising admixing with zinc oxide and sulphur capable of forming a luminescent zinc sulphide upon calcination, a volatile salt of a group consisting of ammonium carbonate, ammonium bicarbonate, urea and thiourea, convertible into carbon dioxide and ammonia by heating, and subjecting the mixture to ignition in a chamber, whereby the luminescent end product is formed in the nonoxidizing atmosphere of carbon dioxide and ammonia developed during the reaction.

6. The method of forming a luminescent composition, comprising admixing with zinc oxide and sulphur capable of forming a luminescent zinc sulphide upon calcination, a saturated solution of a volatile salt selected from the group consisting of ammonium carbonate, ammonium bicarbonate, urea, and thiourea, convertible by heating into carbon dioxide and ammonia, drying the mixture and subjecting the mixture to ignition in a chamber, whereby the luminescent end product is formed in the non-oxidizing atmosphere of carbon dioxide and ammonia developed during the ignition reaction.

7. The method of forming a luminescent composition, comprising admixing with zinc oxide and sulphur capable of forming a luminescent zinc sulphide upon calcination, a saturated solution of a volatile salt selected from the group consisting of ammonium carbonate, ammonium bicarbonate, urea, and thiourea, convertible by heating into carbon dioxide and ammonia, drying the mixture and subjecting the mixture to ignition in a chamber within a range of temperatures extending from 1100° C. to 1250° C., whereby the luminescent end product is formed in the atmosphere of non-oxidizing ammonia and carbon dioxide developed during the reaction.

8. The method of forming a luminescent composition, comprising admixing with zinc oxide and sulphur capable of forming a luminescent zinc sulphide upon calcination, a saturated solution of a volatile salt selected from the group consisting of ammonium carbonate, ammonuim bicarbonate, urea, and thiourea, convertible by heating into carbon dioxide and ammonia, drying the mixture and subjecting the mixture to ignition in a chamber, and for a period of one-half hour to an hour, whereby the luminescent end product is formed in the atmosphere of non-oxidizing ammonia and carbon dioxide developed during the reaction.

9. In a method of forming a luminescent zinc sulphide, the steps which comprise mixing zinc oxide and sulphur crystals in stoichiometric proportions, ammonium carbonate, and heating between the temperatures of 1100° C. to 1250° C. for a period of one-half hour to an hour, whereby the luminescent end product is formed in the atmosphere of non-oxidizing ammonia and carbon dioxide developed during the reaction.

10. In a method of forming luminescent zinc sulphide, the steps which comprise mixing zinc oxide and sulphur crystals in stoichiometric proportions and adding thereto in substantially stoichiometric proportions, a saturated solution of ammonium carbonate, drying and heating between the temperatures of 1100° C. to 1250° C. for a period of one-half hour to an hour, whereby the luminescent end product is formed in the atmosphere of non-oxidizing ammonia and carbon dioxide developed during the reaction.

MAC GOODMAN.